United States Patent [19]

Frano

[11] Patent Number: 5,146,657
[45] Date of Patent: Sep. 15, 1992

[54] SWIVEL SNAP HOOK CONNECTOR ASSEMBLY HAVING INCREASED HOLDING POWER WHEN UNDER LOAD

[75] Inventor: Francis G. Frano, Hoffman Estates, Ill.

[73] Assignee: Illinois Tool Works Inc., Glenview, Ill.

[21] Appl. No.: 857,190

[22] Filed: Mar. 25, 1992

[51] Int. Cl.5 .................. A44B 11/00; A44B 13/00
[52] U.S. Cl. .................. 24/265 H; 24/265 BC; 24/600.3
[58] Field of Search .......... 24/265 H, 265 R, 265 BC, 24/265 AL, 615, 662, 324, 453, 108, 598.9, 600.3, 17 AP

[56] References Cited

U.S. PATENT DOCUMENTS

| 370,333 | 9/1887 | Huff | 24/600.3 |
|---|---|---|---|
| 384,512 | 6/1888 | Dillon | 24/265 H |
| 872,270 | 11/1907 | Bellinger | 24/598.9 |
| 3,128,520 | 4/1964 | Carter et al. | 24/265 H |
| 4,304,403 | 12/1981 | Wilson | 24/615 |
| 4,577,374 | 3/1986 | Lii | 24/265 H |
| 4,868,954 | 9/1989 | Kasai | 24/265 H |

Primary Examiner—Victor N. Sakran
Attorney, Agent, or Firm—T. W. Buckman; J. P. O'Brien

[57] ABSTRACT

A snap hook and complementary buckle member having a connector assembly for connecting the snap hook to the buckle and having increased holding power when under a load including a buckle member having a male connector member to be attached to the snap hook having an elongate stem with first and second opposite ends and a shoulder formed on the first end of the stem having a predetermined shape and exterior dimensions, a snap hook including a female receptor member for receiving the shoulder therein having a tapered channel extending therethrough with a first tapered end, a second opposite flared end and a side wall therebetween forming the channel, the interior dimensions of the first tapered end being smaller, and the interior dimensions of the second flared end being larger, than the exterior dimensions of the shoulder, and at least one slot formed through the side wall of the channel having a first end open to the tapered end and extending along the side wall toward the flared end to terminate in a second closed end of the slot where the slot enables outward resilient expansion of the tapered end for insertion of the shoulder therethrough and where the tapered end closes behind the shoulder about the stem and upon a tensile load between the male and female members the tapered end further collapses against and provides increased holding of the stem behind the shoulder.

16 Claims, 2 Drawing Sheets

SWIVEL SNAP HOOK CONNECTOR ASSEMBLY HAVING INCREASED HOLDING POWER WHEN UNDER LOAD

BACKGROUND OF THE INVENTION

1. Field of the Invention

This invention relates generally to connector assemblies, and more particularly to a connector assembly for a snap hook and complementary buckle member where the connector assembly readily rotatably attaches the snap hook to the buckle member and provides an increased holding or gripping force between the snap hook and the buckle when tension is provided therebetween.

2. Description of the Related Art

Snap hooks typically are utilized with a free end of a cord, strap or the like to quickly and securely connect the free end of the cord to another cord or article. Such snap hooks include a base having a hook and a complementary resilient blade connected to the base where the blade extends from the base to engage the distal end of the hook and close off the area defined by the hook. Manipulation of the blade with respect to the hook enables the hook to capture another member therein and provide the desired connection therewith. In order to secure the base of the snap hook to a free end of the cord which is to be connected to another article, the base can include a connector or buckle member formed with or attached thereto.

During use, the cord typically twists which in turn exerts an undesirable twisting force on the buckle and the snap hook. In order to prevent such twisting forces, a rotatable or swivel-type connection can be provided between the base of the snap hook and the buckle member.

An example of such a swivel connection is illustrated in U.S. Pat. No. 4,868,954 which discloses a swivel joint assembly which includes a connector, an elongate support rotatably mounted on the connector and a hook rotatably mounted to the elongate support. The hook includes a head composed of four locking members angularly and equally spaced and separated by two slots forming a cross-shape, each locking member having a neck and a retaining member formed on its distal end. To rotatably attach the hook head to the elongate support, the retaining members are forced through an aperture in the elongate support while the locking members initially are flexed inward. After the retaining members clear the far side of the aperture, the retaining members flex outward and become seated behind the aperture. This type of connection, however, is subject to failure upon tension placed between the hook and the elongate member which will flex the locking and retaining members inward and pull the retaining members back through the aperture.

It therefore would be desirable to provide a connector assembly for use with a snap hook and complementary buckle member which readily rotatably mounts the snap hook to the buckle and provides an increased holding or gripping force between the snap hook and the buckle when tension is provided therebetween.

SUMMARY OF THE INVENTION

The invention provides a snap hook and complementary buckle member device having a connector assembly for connecting the snap hook to the buckle member and having increased holding power when under a load. The device includes a buckle member having a male connector member with an elongate stem having first and second opposite ends and a shoulder formed on the first end of the stem where the shoulder has a predetermined shape and exterior dimensions. A snap hook having a female receptor member is provided for receiving the shoulder of the first end of the male connector member therein where the female receptor member includes a tapered channel extending therethrough. The channel includes a first tapered end, a second opposite flared end and a side wall interconnecting the first and second ends and forming the channel where the interior dimensions of the tapered end of the channel are smaller, and the interior dimensions of the flared end are larger, than the exterior dimensions of the shoulder of the stem of the male connector member. The channel further includes at least one slot formed through a portion of the side wall of the channel where a first end of the slot is open to the first tapered end of the channel and the slot extends along the side wall a predetermined distance toward the second flared end of the channel and terminates in a second closed end of the slot where the slot enables outward resilient expansion of the first tapered end of the channel for insertion of the shoulder therethrough from the inside of the female receptor member and the first tapered end resiliently closes about the stem behind the shoulder after insertion and, upon placing a tensile load between the male connector member and the female receptor member, the first tapered end further collapses against the stem and provides increased holding of the stem behind the shoulder.

Additionally, the male connector member can be formed to rotate or swivel with respect to the female receptor member, if desired.

DESCRIPTION OF THE PREFERRED EMBODIMENTS

Figure 1:
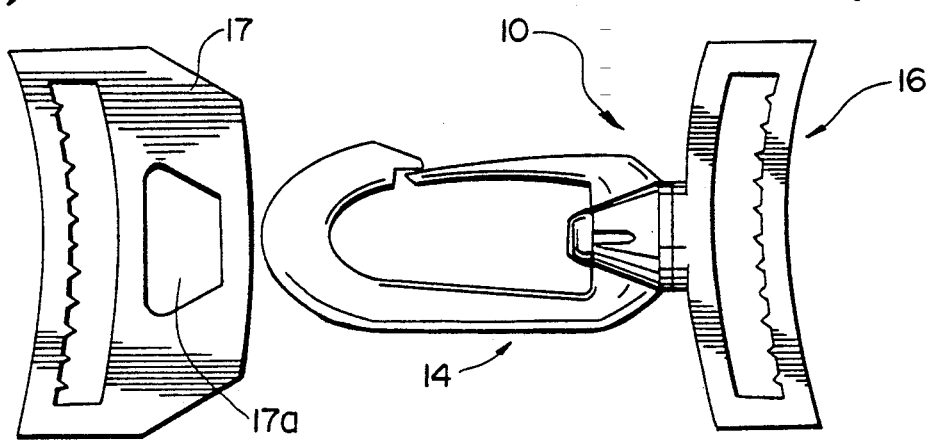
FIG. 1 is a front elevational view of the snap hook connector assembly of the invention illustrating the snap hook and complementary buckle member in juxtaposition with an additional buckle member having an eyelet to be connected to the snap hook.

Referring to FIG. 1, the swivel snap hook assembly of the invention is designated generally by the reference numeral 10. The assembly 10 includes only two discrete parts: a snap hook member 14, illustrated separately in FIG. 2, and a buckle connector member 16, illustrated separately in FIG. 3. Preferably, both the snap hook member 14 and the buckle connector member 16 each are integrally formed in one-piece from plastic and are designed for cooperative engagement with each other as will be explained hereinafter.

Figure 2:
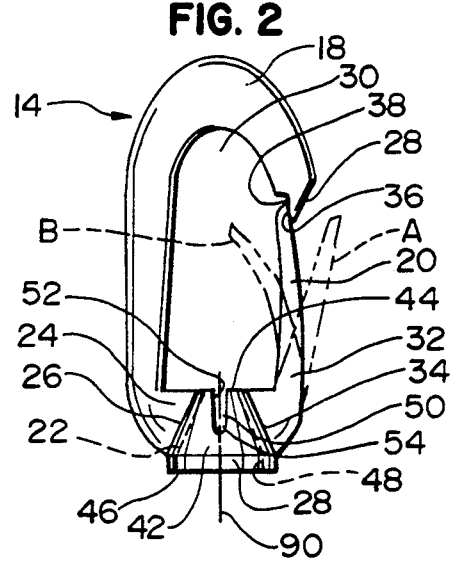
FIG. 2 is a front elevational view of the snap hook member of the assembly of in FIG. 1 illustrating the female receptor member thereof.
Figure 4:
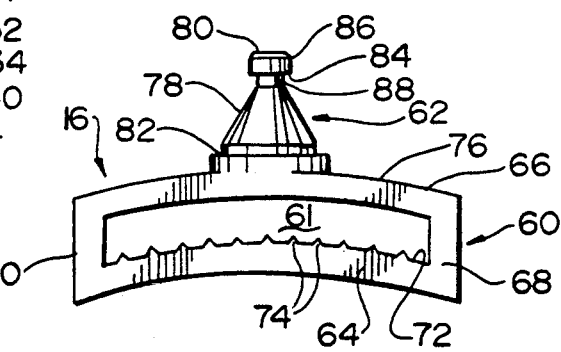
FIG. 4 is a front elevational view of the buckle member of the assembly of FIG. 1 illustrating the male connecting member thereof.

As FIGS. 1 and 2 illustrate, the snap hook member 14 typically is utilized to quickly connect to an additional buckle member 17 having an eyelet 17a therethrough. The snap hook 14 includes a hook portion 18, a blade portion 20 and a base portion 22. The hook portion 18 includes a first proximal end 24, which is integrally formed with a first side 26 of the base portion 22, and a second distal end 28, positioned remote from the base portion 22. The hook portion 18 defines an interior area 30 for capturing another member therein, such as the buckle member 17.

The blade portion 20 includes a first proximal end 32, which is integrally formed with a second side 34 of the base portion 22 opposite the first side 26, and a second distal end 36, positioned remote from the base portion 22 proximate the second distal end 28 of the hook 18. FIG. 2 illustrates three typical positions of the distal end 36 of the blade 20 with respect to the distal end 28 of the hook 18, two of those positions being illustrated in dotted outline and designated by reference letters A and B. The typical operating position of the distal end 36 of the blade 20 is illustrated in solid lines where it is resiliently engaged with an interior surface 38 of the distal end 28 of the hook 18.

In order to provide the resilient engagement, the blade 20 preferably is molded with the distal end 36 in the initial or at-rest position illustrated in dotted outline designated by the reference letter A. After molding and before connection of the snap hook member 14 to another object, the distal end 28 is flexed into its position against the inside surface 38 of the distal end 28 of the hook 18.

Briefly, in operation, to attach the buckle member 17 to the snap hook member 14, the blade 20 is flexed inward within the interior 30 defined by the hook 18 to the position illustrated in dotted outline designated by the reference letter B. Thereafter, the eyelet 17a of the buckle member 17 is inserted over the distal end 28 of the hook 18 and the blade 20 is released so that the distal end 36 of the blade 20 springs back to its position against the inside surface 38 to capture the buckle member 17 within the interior 30. To remove the buckle member 17, this procedure substantially is reversed.

As FIGS. 2 illustrates, the base portion 22 of the snap hook member 14 includes a tapered channel 42, illustrated in dotted outline, extending therethrough from a first interior tapered end 44 to a second exterior flared end 46. The channel 42 generally has the shape of a truncated cone which is defined by an interior wall 48 and is designed to accept a portion of the buckle connector member 16 therein. It is to be understood, however, that the channel 42 can be shaped other than an annular cone, such as rectangular or other shape (not illustrated), so long as it substantially is tapered and provides the cooperative engagement with the buckle connector member 16 as described herein.

Figure 3:
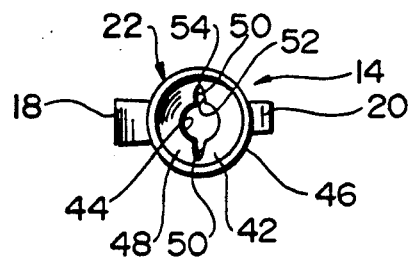
FIG. 3 is a bottom plan view of the snap hook member illustrated in FIG. 2.

As FIGS. 2 and 3 illustrate, the interior wall 48 preferably includes two slots 50 formed on opposite sides therethrough, the lengths of the slots 50 extending along the interior wall 48 a predetermined distance from a first open end 52 to a second closed end 54 of the slots 50. The slots 50 allow for resilient outward expansion and inward contraction of the first tapered end 44 of the channel 42 where the second closed end 54 provides a point or axis of rotation as described below. It is to be understood, however, that the number and shape of the slots 50 can vary so long as the assembly 10 operates as described herein.

The buckle connector member 16 includes a strap or web connector portion 60, to which a strap or web (not illustrated) is threaded about, and a male connector portion 62, which is received within the channel 42 of the base 22 of the snap hook member 14. The strap connector portion 60 substantially is rectangular in shape with an aperture 61 therethrough which is defined by first and second opposite elongate legs 64 and 66 which are interconnected at their ends by first and second opposite end portions 68 and 70, respectively.

The first elongate leg 64 is designed to accept a strap threaded thereabout and includes an interior surface 72 having a plurality of strap gripping teeth 74 spaced along its length. To provide added strength to the first leg 64 and gripping engagement with a strap, especially during tension of the assembly 10, the first elongate leg 64 is slightly bowed inward along its length toward the aperture of the strap connector portion 60.

The second elongate leg 66 is formed opposite the first leg 64 and includes a first exterior surface 76 where the male connector member 62 integrally is formed along the first exterior surface 76 proximate its midpoint. To provide added strength to the second leg 66, especially during tension of the assembly 10, the second leg 66 also can be slightly bowed outward along its length away from the aperture 61 of the strap connector portion 60.

The male connector portion 62 includes a tapered stem 78 having a first tapered distal end 80 and a second flared proximal end 82. The first distal end 80 includes a shoulder 84 formed thereabout for cooperative engagement with the channel 42 of the snap hook member 14. To assist in insertion of the shoulder 84 within the channel 42, a width or side surface 86 of the shoulder 84 can be tapered toward the distal end 80. To assist in seating of the first tapered end 44 of the channel 42 of the snap hook 14 behind the shoulder 84 and about the stem 78, a portion 88 of the stem 78 proximate the shoulder 84 can be linear rather than tapered.

Figure 5:
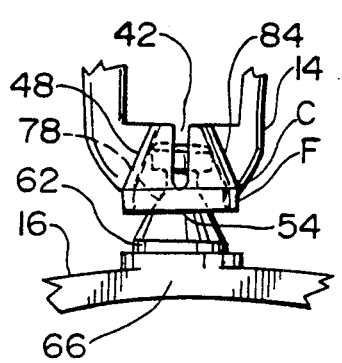
FIG. 5 is an enlarged view of a portion of the assembly of FIG. 1 illustrating the details of connection between the snap hook and buckle members with portions of the male connecting member illustrated in dotted outline.
Figure 6:
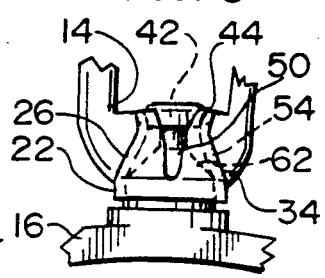
FIG. 6 is an enlarged view of a portion of the assembly, similar to FIG. 5, illustrating flexing of the female receptor member during insertion of the male connecting member.

To assemble the buckle member 16 to the snap hook member 14, the male connector member 62 of the buckle member 16 is inserted into the channel 42 of the snap hook member 14 from the second exterior flared end 46 of the channel 42. As FIG. 5 illustrates, continued insertion of the male connector member 62 provides contact of the shoulder 84 with the interior wall 48 of the channel 42 at a predetermined position C. As FIG. 6 illustrates, further insertion of the male connector member 62 causes resilient outward expansion of the first tapered end 44 of the channel 42. Expansion of the first tapered end 44 substantially is provided by the slots 50 which flex outward and effectively provide rotation of the first and second sides 26 and 34 of the base portion 22 about the second closed ends 54 of the slots 50. Upon continued insertion of the male connector member 62, the slots 50 flex further outward until the shoulder 84 clears the first tapered end 44 of the channel 42 and the first tapered end 44 snaps back to its original at-rest position illustrated in FIG. 1 where it is collapsed about the liner portion 88 of the stem 78 beneath the shoulder 84.

In this position, the male connector member 62 is retained within the channel 42 and the tapered portion of the stem 78, which substantially complements the taper of the channel 42, can rotate within the channel 42 to provide the desired swivel or rotational connection between the snap hook member 14 and the buckle connector member 16.

Figure 7:
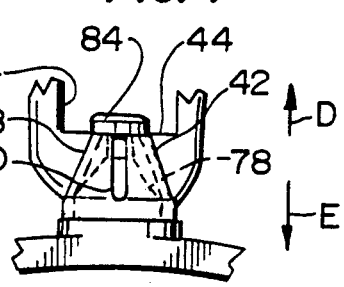
FIG. 7 is an enlarged view of a portion of the assembly, similar to FIGS. 5 and 6, illustrating the increased gripping or holding feature of the assembly during a load condition.

FIG. 7 illustrates increased gripping or holding of the buckle member 16 within the snap hook member 14. Specifically, upon tension between the buckle member 16 and the snap hook member 14, illustrated by oppositely pointing arrows D and E, the tapered end 44 of the channel 42 further collapses, due to inward flexing of the slots 50 as illustrated, and grips the linear portion 88 of the stem 78 beneath the shoulder 84, the gripping increasing with increased tension. This type of tension typically is provided during use of such swivel hook assemblies and significantly expands the use of the assembly 10 of the invention into applications requiring increased tension.

Preferably, as FIG. 2 illustrates, the channel 42 is tapered at an angle of approximately twenty degrees (±one degree) with respect to a central longitudinal axis 90 of the channel 42. Furthermore, as FIG. 5 illustrates, the outside dimension or diameter of the shoulder 84 is selected to be less than the inside dimension or diameter of the channel 42 at a position F which substantially corresponds to the position of the closed end 54 of the slot 50 in the interior wall 48 of the channel 42. Additionally, to provide the desired flexing without failure or breakage of the snap hook member 14, it has been determined that the length of each slot 50 between the first open end 52 and the second closed end 54 should be approximately sixty percent (±10 percent) of the total length of the channel 42. These dimensions have been determined to be critical for the proper operation of the assembly 10 when formed with the preferred plastic material.

Figure 8:
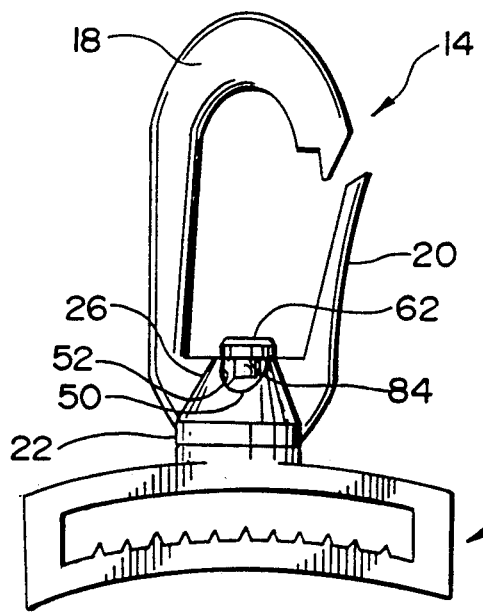
FIG. 8 is an enlarged view of the assembly illustrating the assembly under an extreme loading condition.

The assembly 10 of the embodiment of FIGS. 1-7 is capable of performing under tensile load conditions greater than that of previous assemblies. Under extreme tensile load conditions, however, the assembly 10 can fail either by breakage of the plastic material or by sever distortion as FIG. 8 generally illustrates. Typically, as the tensile load is increased, the blade portion 20 snaps outside the confines of the hook portion 18. Upon further tensile load, the slots 50 expand and the edges of the open ends 52 of each slot 50 on the side of the slots 50 proximate the first side 26 of the base portion 22 move or walk along the shoulder 84 of the male connector portion 62. When the edge of each slot 50 clears the shoulder 84, the male connector portion 62 disengages from the channel 42 of the snap hook member 14.

Figure 9:
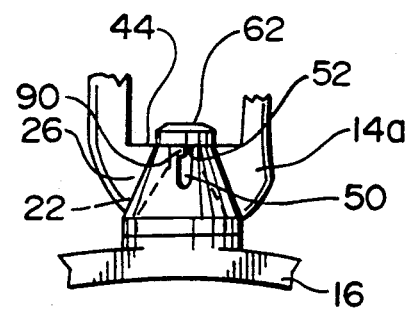
FIG. 9 is an enlarged view of another embodiment of the assembly of the invention illustrating further increased holding power during extreme loading conditions.

FIG. 9 illustrates another embodiment of the assembly of the invention which provides increased holding power during such extreme tensile load conditions where similar elements have been identified with the same reference numerals. In this embodiment, the snap hook member 14a is modified so that the open end 52 of each slot 50 includes a rib 90 which is integrally formed with the first tapered end 44 of the base portion 22 on the first side 26 of the base portion 22. The ribs 90 extend into the interior of each slot 50 a predetermined distance and substantially perpendicular to the length of each slot 50.

The further the ribs 90 extend across the slots 50 the more holding power provided. If desired, the ribs 90 can extend all the way across the slots 50 to engage the other sides of the slots 50 if desired. Preferably, the ribs 90 extend slightly past the longitudinal central axis of each slot 50, but can vary.

During increased tensile load between the snap hook member 14a and the buckle connector member 16, the blade portion 20 snaps outside the confines of the hook portion 18 and the slots 50 expand as in the embodiment of FIGS. 1-7. In the embodiment of FIG. 9, however, the edge of each slot 50 is extended by the ribs 90 which delays the clearing of the shoulder 84 to provide the desired increased holding.

Modifications and variations of the present invention are possible in light of the above teachings. It therefore is to be understood that within the scope of the appended claims, the invention may be practiced otherwise than as specifically described.

What is claimed and desired to be secured by Letters Patent is:

1. A snap hook and complementary buckle member device having a connector assembly for connecting the snap hook to the buckle member and having increased holding power when under a load comprising:

a buckle member having a male connector member formed therewith to be attached to the snap hook, said male connector member having an elongate stem with first and second opposite ends and a shoulder formed on said first end of said stem, said shoulder having a predetermined shape and exterior dimensions;

a snap hook member including a female receptor member formed therewith for receiving said male connector member therein, said female receptor member having a tapered channel extending therethrough, said channel having a first tapered end, a second opposite flared end and a side wall interconnecting said first and second ends and forming said tapered channel, the interior dimensions of said first tapered end being smaller, and the interior dimensions of said second flared end being larger, than said exterior dimensions of said shoulder of said stem; and at least one slot formed through a portion of said side wall of said channel, a first end of said slot being open to said first tapered end of said channel, said slot extending along said side wall a predetermined distance toward said second flared end of said channel and terminating in a second closed end of said slot, said slot enabling outward resilient expansion of said first tapered end of said channel for insertion of said shoulder therethrough from the inside of said female receptor member, said first tapered end resiliently closing about said stem behind said shoulder after insertion and, upon placing a tensile load between said male connector member and said female receptor member, said first tapered end further collapses against and provides increased holding of said stem behind said shoulder.

2. The device as defined in claim 1 including a pair of slots, one each formed along said side wall of said channel on opposite side portions of said first tapered end of said channel to provide said increased holding.

3. The device as defined in claim 2 wherein said first end of each of said slots includes a rib member which extends into the interior of said slots a predetermined distance to increase the holding power of said device.

4. The device as defined in claim 1 wherein said second end of said male connector member includes attachment means formed integrally therewith for connecting said second end of said male connector member to another article.

5. The device as defined in claim 1 wherein said male connector member rotates with respect to said female receptor member after assembly.

6. The device as defined in claim 5 wherein said male connector member and said female receptor member are annular.

7. The device as defined in claim 1 wherein said side wall and said at least one slot of said channel have predetermined lengths, said predetermined length of said slot substantially being sixty percent of the predetermined length of said side wall.

8. The device as defined in claim 1 wherein said channel of said female connector member substantially is tapered at an angle of twenty degrees with respect to a central longitudinal axis of said channel.

9. The device as defined in claim 1 wherein said exterior dimensions of said shoulder of said male connector member are less than an interior dimension of said tapered channel member at a position along said length of said channel member proximate said second closed end of said slot.

10. A connector assembly having increased holding power when under a load, the assembly comprising:
   a male connector member having an elongate stem with first and second opposite ends and a shoulder formed on said first end of said stem, said shoulder having a predetermined shape and exterior dimensions;
   a female receptor member for receiving said male connector member therein, said female receptor member having a tapered channel extending therethrough, said channel having a first tapered end, a second opposite flared end and a side wall interconnecting said first and second ends and forming said tapered channel, the interior dimensions of said first tapered end being smaller, and the interior dimensions of said second flared end being larger, than said exterior dimensions of said shoulder of said stem; and
   at least one slot formed through a portion of said side wall of said channel, a first end of said slot being open to said first tapered end of said channel, said slot extending along said side wall a predetermined distance toward said second flared end of said channel and terminating in a second closed end of said slot, said slot enabling outward resilient expansion of said first tapered end of said channel for insertion of said shoulder therethrough from the inside of said female receptor member, said first tapered end resiliently closing about said stem behind said shoulder after insertion and upon placing a tensile load between said male connector member and said female receptor member said first tapered end further collapses against and provides increased holding of said stem behind said shoulder.

11. The connector assembly as defined in claim 10 including a pair of slots, one each formed along said side wall of said channel on opposite side portions of said first tapered end of said channel to provide said increased holding.

12. The connector assembly as defined in claim 11 wherein said first end of each of said slots includes a rib member which extends into the interior of said slots a predetermined distance to increase the holding power of said connector assembly.

13. The connector assembly as defined in claim 10 wherein said male connector member and said female receptor member are annular and said male connector member is rotatable with respect to said female receptor member when connected thereto.

14. The connector assembly as defined in claim 10 wherein said side wall and said slot of said channel have predetermined lengths, said predetermined length of said slot substantially being sixty percent of the predetermined length of said side wall.

15. The connector assembly as defined in claim 10 wherein said channel of said female connector member substantially is tapered at an angle of twenty degrees with respect to a central longitudinal axis of said channel.

16. The connector assembly as defined in claim 10 wherein said exterior dimensions of said shoulder of said male connector member are less than an interior dimension of said tapered channel member at a position along said length of said channel member proximate said second closed end of said slot.

* * * * *